US012715995B2

(12) United States Patent
Saricaoğlu et al.

(10) Patent No.: US 12,715,995 B2
(45) Date of Patent: Aug. 25, 2026

(54) USE OF INNOVATIVE TECHNOLOGIES IN THE PRODUCTION OF GELATINE FROM ANIMAL TISSUES

(71) Applicants: BURSA TEKNIK ÜNIVERSITESI REKTÖRLÜGÜ, Yildirim (TR); GÜMÜŞHANE ÜNIVERSITESI, Gümüşhane (TR)

(72) Inventors: Furkan Türker Saricaoğlu, Yildirim (TR); Halil İbrahim Odabaş, Gümüşhane (TR); Adnan Fatih Dağdelen, Osmangazi (TR); Fatma Tuba Pìrìnç, Yildirim (TR)

( * ) Notice: Subject to any disclaimer, the term of this patent is extended or adjusted under 35 U.S.C. 154(b) by 447 days.

(21) Appl. No.: 18/550,532

(22) PCT Filed: Mar. 4, 2022

(86) PCT No.: PCT/TR2022/050194

§ 371 (c)(1),
(2) Date: Sep. 14, 2023

(87) PCT Pub. No.: WO2022/197269

PCT Pub. Date: Sep. 22, 2022

(65) Prior Publication Data

US 2024/0158636 A1 May 16, 2024

(30) Foreign Application Priority Data

Mar. 16, 2021 (TR) ................................ 2021/004866

(51) Int. Cl.
*A61K 36/00* (2006.01)
*C08H 1/06* (2006.01)
*C08L 89/06* (2006.01)

(52) U.S. Cl.
CPC ................ *C08L 89/06* (2013.01); *C08H 1/06* (2013.01)

(58) Field of Classification Search
None
See application file for complete search history.

(56) References Cited

FOREIGN PATENT DOCUMENTS

| | | | |
|---|---|---|---|
| CN | 101735464 | A | 6/2010 |
| CN | 103146308 | A | 6/2013 |
| TR | 2019/15913 | | 10/2019 |
| WO | 9421739 | A1 | 9/1994 |
| WO | 2012160575 | A2 | 11/2012 |

OTHER PUBLICATIONS

International Search Report for corresponding PCT/TR2022/050194 dated Dec. 23, 2022.
Written Opinion of the International Searching Authority for corresponding PCT/TR2022/050194 dated Dec. 23, 2022.

*Primary Examiner* — Russell G Fiebig
(74) *Attorney, Agent, or Firm* — Egbert, McDaniel & Swartz, PLLC

(57) ABSTRACT

Disclosed is use of innovative technologies in the production of gelatine from animal tissues. The method is adapted to shorten the retention time of animal tissues to be stored in an acid or alkaline environment during the pre-treatment stage, to increase the extraction efficiency and to improve the functional properties of gelatine. The method includes the steps of the skins or bones that are the raw material of gelatine, ohmic system, ultrasound system, high hydrostatic pressure system, a high pressure homogenization system and microwave system technology selected from a group consisting of single, double, triple or quadruple combinations of collagen exposed to the inflating, conversion of inflated collagens into gelatine and performing the extraction process with the ohmic system.

1 Claim, 3 Drawing Sheets

USE OF INNOVATIVE TECHNOLOGIES IN THE PRODUCTION OF GELATINE FROM ANIMAL TISSUES

TECHNICAL FIELD

Figure 1:
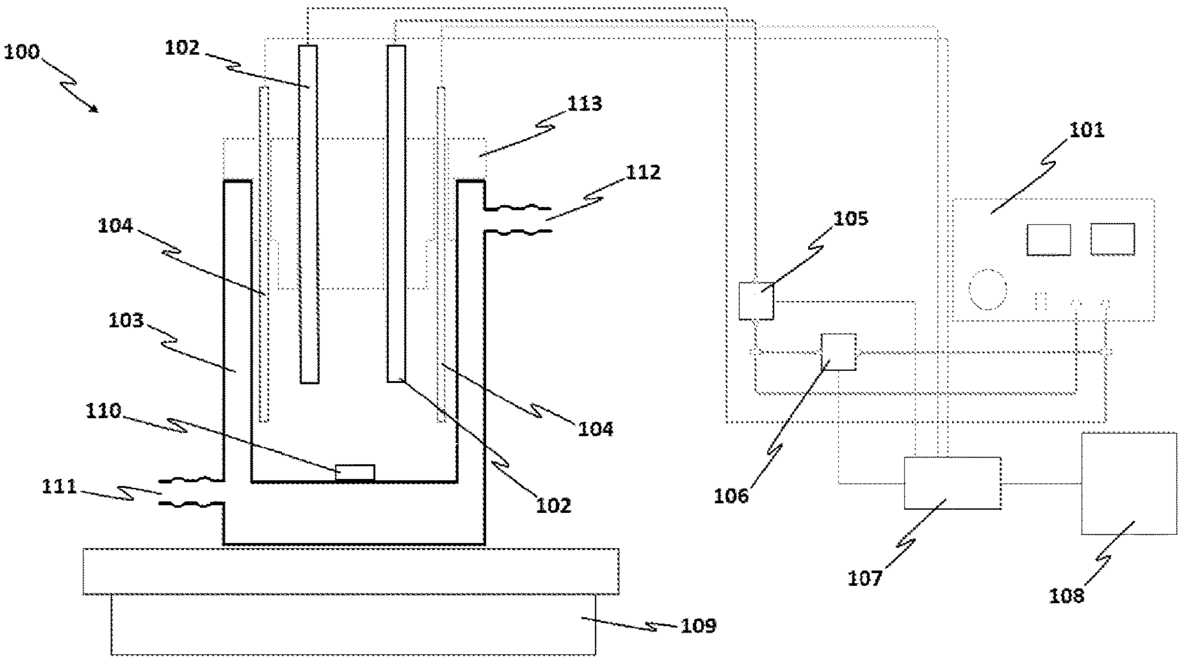

The invention relates to a method for the production of gelatine from animal tissues, which has a widespread use in pharmaceuticals, cosmetics, medicine and photographic products, mainly in the food industry.

The invention is specifically designed to shorten the retention time of animal tissues to be stored in an acid or alkaline environment during the pre-treatment stage, to increase the extraction efficiency and to improve the functional properties of gelatine and it includes the steps of the skins or bones that are the raw material of gelatine, ohmic system, ultrasound system, high hydrostatic pressure system, high pressure homogenization system and microwave system technology selected from a group consisting of single, double, triple or quadruple combinations of collagen exposed to the inflating, conversion of inflated collagens into gelatine and performing the extraction process with the ohmic system.

PRIOR ART

Gelatine is a semi-transparent, colorless, easily broken, tasteless solid substance made from animal connective tissue, which has a protein structure. It is obtained as a result of controlled hydrolysis of collagen obtained from the skin and bones of living things such as pigs, cattle and seafood by heat application. Recently, the production of gelatine from fish and chicken skins and bones has also been increasing rapidly. It is one of the most widely used food additives today due to its biocompatibility and biodegradation properties, as well as its positive properties such as non-toxicity and non-dependence. Gelatine is used in the food industry, as well as in the pharmaceutical, cosmetic, glue and photographic industries, especially for the purpose of creating gels. The main uses of gelatine in the food industry can be listed as emulsifier, stabilizer, clarifying agent and coating material.

Collagen, which is found as a connective tissue protein in animal tissues, is converted into gelatine as a result of partial hydrolysis. Since there is no collagen in vegetable tissues, the use of animal tissues is mandatory for the production of gelatine. Gelatine, which can be converted into solution and gel forms by heating and cooling processes, has a widespread use in pharmaceuticals, cosmetics, medicine and photographic products, especially in the food industry due to this property. The production of gelatine worldwide has reached a remarkable figure of about 600 thousand tons/year. Of this amount, 46% is produced from pig skin, 29% from beef skin, and 23% from the bones of these animals. 60% of gelatine production in Europe is obtained from pork and 40% from cattle and other animals. Considering the consumer preferences of gelatine, which is quite common in the field of use, it is extremely important that it can also be produced from alternative tissues.

In 2019, a total of 620 thousand tons of gelatine were produced worldwide, and a significant part of this amount, such as 46%, was produced from pork. The fact that the consumption of pork and its products is religiously prohibited in Muslim and Jewish communities, and cattle is considered sacred in Indian society has allowed alternative tissues of gelatine production to be explored. Therefore, the production of gelatine from the by-products of the fish and poultry sector has become important. The production of gelatine in our country is about 15000 tons per year, and it is known that it does not meet consumption. For this reason, the need for gelatine is met by imported means, and products containing gelatine are treated suspiciously in the eyes of consumers. The main reason for this is that the exact tissue from which gelatine is obtained and the method of its production are not known to consumers, there is a possibility that imported gelatine is of pork origin.

In the known technique, the production of gelatine from animal tissues is carried out by converting collagen into gelatine in a hot water environment following certain preliminary processes. For this purpose, collagen-rich animal tissues are subjected to cleaning, soaking in acid and alkaline environments, and finally gelatine extraction is carried out with water at temperatures above 40° C. The resulting extraction solution is made into gelatine leaves by processes such as thickening and drying at later stages. Gelatine extraction from animal tissues containing collagen is influenced by many factors such as temperature, waiting time, solvent type, solvent/solid ratio, raw material shape and structure and pH. Collagen-rich animal tissues that are purified from impurities in gelatine production are kept in an acid or alkaline environment depending on the raw material, and the collagen structure is expected to swell. This standby time can last 48 hours or more, which can lead to significant energy loss. Accelerating improvements in the gelatine extraction process are very important on an industrial scale and can have effects on improving gelatine yield and gel-forming properties.

In the known case of the technique, applications for the production of gelatine from different animal tissues have been found. A patent application numbered JP2004300109A describes a method for producing proteins such as collagen, gelatine and collagen peptide from animal tissue in high purity and at low cost. The subject of the invention is a method, that contains a protein as raw material, animal tissue and/or tap on an animal of animal skin be free of oil and pre-processing after an acidic protease to be immersed in a solution of acid and an acid or acid soluble protein extraction purification and concentration step includes the steps of in.

In the patent application numbered WO2012160575A2, an economically viable production method is mentioned for producing high-quality gelatine from the skin, bones and scales of fish. In the method of the invention, the fish cleaning at low temperatures, boneless meat, swimming bladder, cartilage and other impurities of the skin, bones and fish scales separation, skin, bone and scales be wetted with the protease enzyme, the mixture obtained at low temperature and washed with alkali be wetted with water for at least 2 hours, washed with water and acid at a low temperature for at least 2 hours and the resulting mixture of the gelatine be wetted with approximately 40° C. and 70° C. at a temperature of approximately includes the steps to be extracted at neutral pH.

In the patent application numbered TR201915913; collagen is obtained from tendons of animal origin (cattle and/or small cattle), while its suitability for industrial production in terms of stocking or stocking time at high capacity is explained by a method developed, which is stated to be more advantageous than its counterparts. The advantage of stocking prevents the degradation of the protein-based product. It is also stated that it facilitates the use of tendon in shredding and pulverizing processes and extends its shelf life.

As with the methods used in these applications, the long waiting processes experienced in the production of gelatine can cause difficulties in the production of gelatine and increase the cost. Traditional methods applied in these aspects have significant disadvantages.

As a result, due to the aforementioned negativities and deficiencies, there has been a need to make an innovation in the relevant technical field.

Purpose of the Invention

The present invention relates to the use of innovative technologies in the production of gelatine from animal tissues, which meet the above-mentioned requirements, eliminate all the disadvantages and bring some additional advantages.

The main purpose of the invention is to shorten the holding time of animal tissues that will be kept in an acid or alkaline environment during the pre-treatment stage, increase the extraction efficiency and improve the functional properties of gelatine.

The purpose of the invention is to reduce the amount of chemicals that will be used for extraction purposes in the production of gelatine, and therefore the amount of waste chemicals that will be released.

The purpose of the invention is to facilitate the conversion of collagen into gelatine.

The purpose of the invention is to present a method that allows producing gelatine leaves that are more effective, efficient and advanced in terms of functional properties compared to existing processes.

The purpose of the invention is to provide a method that reduces the time of production of gelatine from animal tissues and reduces the cost of its production.

In order to fulfill the above-described purposes, the invention includes the process stages of:

a. separation of gelatine dissolved in water into two phases as water and gelatine in ultra-filtration devices, b. the gelatine phase and the dissolved collagens obtained by removing the separated water phase, cooling of refrigeration systems to appropriate processing temperatures, c. production of gelatine particles (leaves) by completely removing the relatively aqueous gelatine from the water and increasing its dry matter to 95% levels, it is a method related to the production of gelatine from animal tissues, which has a widespread use in pharmaceuticals, cosmetics, medicine and photographic products, especially in the food industry. Its feature is to shorten the holding time of animal tissues that will be kept in an acid or alkaline environment during the pretreatment stage applied in the classical method, to increase the extraction efficiency and to improve the functional properties of gelatine, before process step a;

the skin or gelatine which is the raw material of bones; ohmic system (100), the ultrasound system (200), high hydrostatic pressure system (300), high pressure homogenization system (400) and microwave system (500) technology selected from a group consisting of single, double, triple or quadruple combinations of collagen exposed to the inflating, in order to ensure that the inflated collagens turn into gelatine, the extraction process is carried out using the ohmic system (100).

The structural and characteristic features of the invention and all its advantages will be more clearly understood thanks to the detailed description given below, and therefore the evaluation should also be carried out taking into account this detailed description.

FIGURES DESCRIBING THE INVENTION

FIG. 1: The subject of the invention is a schematic view of the ohmic system used in the gelatine production method.

Figure 2:
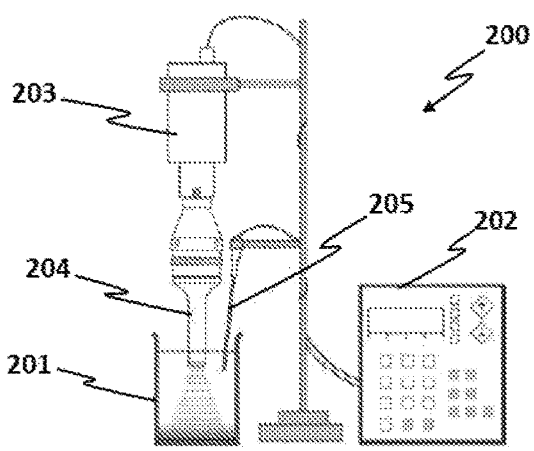

FIG. 2: The subject of the invention is a schematic view of the ultrasound system used in the gelatine production method.

Figure 3:
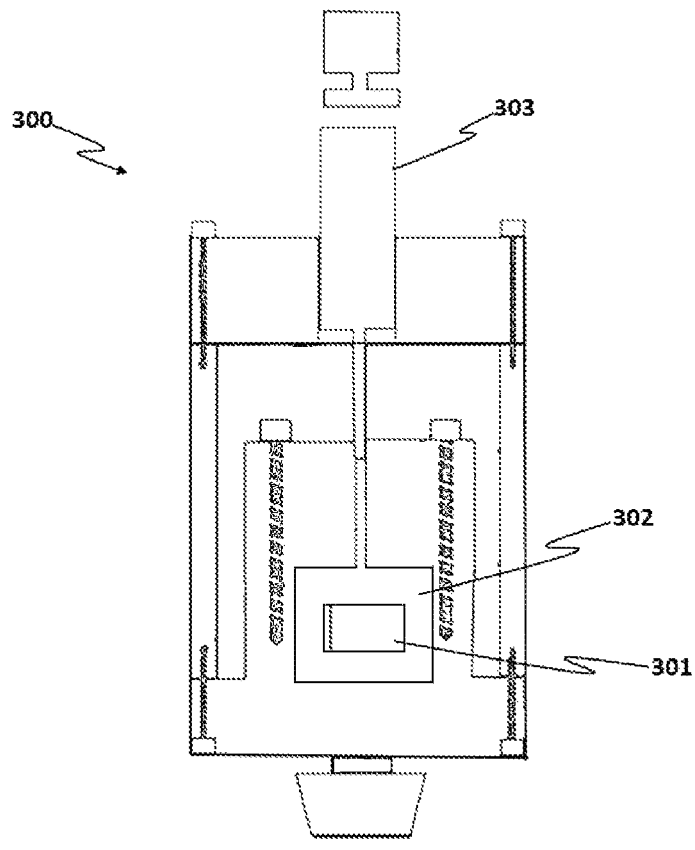

FIG. 3: The subject of the invention is a representative view of the high hydrostatic pressure system used in the gelatine production method.

Figure 4:
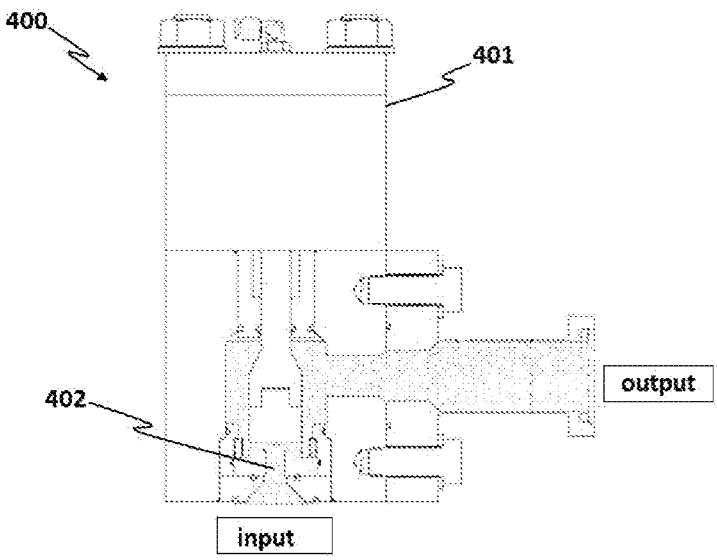

FIG. 4: The subject of the invention is a schematic view of the high homogenization system used in the gelatine production method.

Figure 5:
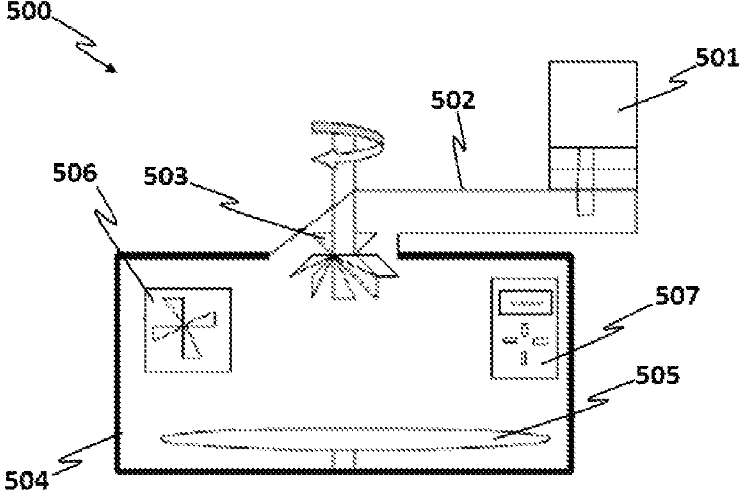

FIG. 5: The subject of the invention is a representative view of the microwave system used in the gelatine production method.

The drawings don't have to be scaled according to the original product and some details may have been omitted to clearly describe the invention. Parts that are identical to a great extent or that have equivalent functions have been represented with the same reference number.

DESCRIPTION OF THE PART REFERENCES

100. Ohmic system
101. Isolated tuned transformer
102. Titanium probe
103. Sample container
104. Thermal couples
105. Current converter
106. Voltage reducer
107. Data collection unit
108. Computer
109. Magnetic stirrer
110. Magnetic fish
111. Refrigerant inlet
112. Refrigerant output
113. PTFE cover
200. Ultrasound system
201. Sample container
202. Control unit
203. Piezoelectric ceramic digital dispenser
204. Titanium homogenization nozzle
205. Temperature probe
300. High hydrostatic pressure system
301. Polyethylene bags
302. The pressure cell
303. Piston
400. High pressure homogenization system
401. The homogenization block
402. Range
500. Microwave system
501. The Magnetron
502. Router
503. Microwave dispenser
504. Bakery
505. Turntable
506. Fan
507. Control unit

DETAILED DESCRIPTION OF THE INVENTION

In this detailed description, the use of innovative technologies in the production of gelatine from animal tissues have been described only to provide further understanding of the invention, without intending to have a limiting effect on the invention.

The invention relates to a method for the production of gelatine from animal tissues, which has a widespread use in pharmaceuticals, cosmetics, medicine and photographic products, mainly in the food industry. The invention is specifically designed to shorten the retention time of animal tissues to be stored in an acid or alkaline environment during the pre-treatment stage, to increase the extraction efficiency and to improve the functional properties of gelatine and it includes the steps of the skins or bones that are the raw material of gelatine, ohmic system (100), ultrasound system (200), high hydrostatic pressure system (300), high pressure homogenization system (400) and microwave system (500) technology selected from a group consisting of single, double, triple or quadruple combinations of collagen exposed to the inflating, conversion of inflated collagens into gelatine and performing the extraction process with the ohmic system (100).

Gelatine is a substance in the structure of proteins. It has the potential to exhibit properties such as emulsifying, foaming, increasing the stability of liquid-liquid mixtures, increasing the consistency of liquid dispersions, and these mentioned properties constitute the functional properties of gelatine. These mentioned properties of gelatine are improved by the method subject to the invention.

The present invention is relates to the production of gelatine from beef, pig skin and by-products of the poultry sector as raw materials, ohmic system (100), ultrasound system (200), high hydrostatic pressure system (300) relates to the use of high pressure homogenization system (400) and microwave system (500) technologies; combinations of single, double, triple, quadruple or quintuple in the pre-treatment and/or extraction step. Collagen-rich animal tissues, which will be stored in an acid environment after the supply of appropriate raw materials, are subjected to a pre-treatment process with the mentioned technological devices during this period. In this way, it is easier to convert collagen into gelatine at later stages and improved gelatine leaves are produced in terms of more effective, efficient and functional properties compared to existing gelatine production processes. Then, according to customer demands, gelatine leaves can be ground into various sizes and packaged and offered for sale.

FIG. 1 shows a schematic view of the ohmic system (100) used in the gelatine production method subject to the invention. The ohmic system (100) provides rapid heating of the products by applying an electric current to the solid-liquid medium and accelerating the transition of the products contained in the solid material and desired to be extracted to the liquid phase. At the same time, changes may occur in the internal structure of products that have passed into the liquid phase, and this may contribute to the improvement of various properties. The electric current supplied from the isolated tuned transformer (101) is sent to the titanium probes (102). The titanium probes (102) are immersed in the sample container (103) so that the electric current from the isolated tuned transformer (101) reaches the sample container (103). In order to prevent overheating of the sample container (103) or to work at the desired temperature degrees, the sample container (103) is surrounded by a cooling jacket. The temperature from the thermal pairs (thermocouples) (104) immersed in the sample container (103) is, data consisting of variables such as electrical conductivity, the current is transferred to the data acquisition unit (107) by means of a converter (105) and the data received here is recorded by the computer (108). A magnetic stirrer (109) and a magnetic fish (110) are used to uniformly mix the sample container (103). Thus, a homogeneous heating and mixing process is carried out on all sides of the sample. By means of the electrical current sent to the sample container (103), the sample container (103) is rapidly delivered to the set temperature. In this way, the gelatine extraction is accelerated with a fast and effective heating and the extraction time is shortened considerably. In the ohmic system (100), a voltage reducer (106) is used for the purpose of system connection, which allows electronic data from the system to be transferred to the computer (108), while keeping the system temperature constant at the desired levels is provided by means of the cooler input and output (111, 112). The PTFE cover (113) provides insulation of the sample container (103) in which the sample is placed.

FIG. 2 shows a schematic view of the ultrasound system (200) used in the gelatine production method subject to the invention. The ultrasound system (200) creates cavitation bubbles in a liquid solution medium. As a result of the spontaneous explosion of these bubbles formed, energy and pressure are emitted into the environment. This released energy and pressure accelerate the transition of the components contained in the solid to the liquid phase. At the same time, it can lead to some changes in the chemical bond structures of substances that pass into the liquid phase. The gelatine raw material or gelatine solution placed in the sample container (201) is treated with ultrasound parameters set from the control unit (202). Variables such as amplitude, duration, effect and temperature entered into the control unit (202) are converted into ultrasonic sound waves by means of piezoelectric ceramic distributor (203). Then, these sound waves from the titanium homogenization nozzle (204) are transferred to the sample container (201) and cause cavitation bubbles to form in the sample container (201). The formed cavitation bubbles have a certain energy. if the bubbles burst, this energy is released, which both heats up the substance in the sample container (201) and causes deformation of the cellular structure of the sample, accelerating the transition of substances inside the cell to a liquid medium outside the cell. Thus, the extraction of gelatine from the gelatine raw material contained in the sample container (201) becomes easier and the extraction efficiency is increased. In the ultrasound system (200), an increase in ambient temperature occurs during the application period. Monitoring and control of this increase is provided by means of the temperature probe (205).

FIG. 3 shows a representative view of the high hydrostatic pressure system (300) used in the gelatine production method subject to the invention. In a high hydrostatic pressure system (300), the solid material is placed in polyethylene bags (301) and their mouths are closed, placed in a pressure cell (302) consisting of a reservoir filled with ultrapure water, and the sample is compressed by the movement of the piston (303) in a water environment. As a result of compressing the water around the sample, pressure is applied to the gelatine raw material, and thanks to this pressure applied, the collagen swells and the gelatine extraction becomes easier. In this way, the gelatine extraction process is accelerated and the extraction efficiency is also increased.

FIG. 4 shows a schematic view of the high homogenization system (400) used in the gelatine production method subject to the invention. High pressure homogenization system (400), initially with large particle sizes solid-liquid or liquid-liquid homogenization in a suspension or dispersion of the Block (401) range from a thin (402) with a particle size of achieving significant reductions in forced to cross system. Thus, the suspension or dispersions are made more stable. Significant reductions in particle sizes will be achieved by passing gelatine raw materials and/or gelatine solutions through this system. Reducing the particle size will increase the surface area of the gelatine raw material and/or gelatine solutions, which can speed up the extraction of gelatine and shorten the time. At the same time, reductions in particle sizes will also be able to lead to improvements in the functional properties of gelatine. For example, with a decrease in the particle size, the surface area may increase, and by partially observing an increase in the parts of gelatine that may come into contact with water or oil, functional properties such as solubility, water and oil binding may be improved.

By means of the microwave system (500), the molecules in the internal structure of the material in the form of electromagnetic waves are animated and heating and molecular structure change are ensured. Thus, the process of the extraction process is shortened. FIG. 5 shows a representative view of the microwave system (500) used in the gelatine production method subject to the invention. The microwaves generated by a magnetron (501) are sent to the sample placed on the turntable (505) in the oven (504) by means of the router (502) and microwave distributor (503). The heating that occurs in the product in which microwaves come into contact with the oven (504) is distributed uniformly in the oven (504) with the help of a fan (506). With the help of the control unit (507), the microwave intensity and duration to be applied can be adjusted. When the gelatine raw material and/or the gelatine aqueous solution are placed in the microwave system (500) and subjected to microwave treatment at different intensities and durations, some changes in the heating or molecular structure occur as a result of the movements in the molecules. As a result of these changes, the gelatine extraction time is shortened and the gelatine yield is increased.

The Classical Method of Gelatine Production from Animal Tissues;

a. In the case of using skin from animal tissues, shredding is applied as a pre-treatment and the fragmented skins are kept in alkaline tanks, in the case of using bone tissues as raw materials, bone tissues are kept in an acidic environment,
b. Swelling of collagen after raw materials stored in an alkaline or acidic environment are taken into an acid or alkaline environment, respectively and completion of pre-processing steps with removal of other proteins,
c. Keeping the inflated collagens in a hot pure water environment to ensure that they turn into gelatine,
d. Separation of gelatine dissolved in water into two phases as water and gelatine in ultra-filtration devices,
e. The gelatine and the dissolved collagens phase obtained by removing the separated water phase, cooling of refrigeration systems to appropriate processing temperatures,
f. Production of gelatine particles (leaves) by completely removing the relatively aqueous gelatine from the water at the final stage and increasing its dry matter to 95% levels.

The subject of the invention is the production method, in the pre-processing step, which are the processing steps a and b of the classical production method expressed above, ohmic system (100) of the ultrasound system (200), high hydrostatic pressure system (300), high pressure homogenization system (400) and microwave system (500) technology selected from a group consisting of combinations of singlet, binary, triple or quadruple are exposed to the ohmic system (100) at the extraction step, which is the c process step.

It has been subjected to acid or alkaline pre-treatment of raw materials gelatine ohmic environments that the system (100) and Ultrasound System (200), high hydrostatic pressure system (300), high pressure homogenization system (400) and microwave system (500) may be used alone or in combination, without distinction as well. In the production of gelatine by the classical method, the decanting time in an acid or alkaline environment can vary between 48 hours and 1 week. Shortening this time with innovative technologies (ohmic system (100) and the ultrasound system (200), high hydrostatic pressure system (300), high pressure homogenization system (400) and microwave system (500)) significantly reduces the total extraction time and also significantly increases the extraction efficiency, as it causes significant changes in the structure of gelatine raw materials. In step c of the classical gelatine production, the soaking process is carried out in a hot water environment. In a hot water environment, collagen is converted into gelatine. In the method subject to the invention, this process is performed with the ohmic system (100). The introduction of direct electric current into the gelatine solution helps to warm up the medium in a much shorter time and the extraction takes place much faster. At the same time, gelatine extraction is carried out with a much more economical system compared to the classical method.

The fact that the skins or bones that are the raw materials of gelatine are exposed to innovative technologies such as ohmic system (100) and the ultrasound system (200), high hydrostatic pressure system (300), high pressure homogenization system (400) and microwave system (500), alone or in a certain sequence before processing also significantly affects the process of converting the collagen contained in the raw material into gelatin. Because the mentioned innovative technologies cause significant changes in the structure and thus the yield can be increased while reducing the extraction time.

Experimental Study;

In the study, the classical production method and the production method using the ohmic system (100) were compared. It was found that the extraction time was shortened by at least 40% compared to the classical method by using the ohmic system (100) during storage in an alkaline environment. In addition, it has been found that the yield of gelatine increases by at least 20% with such application. In the process of converting collagen into gelatine, an ohmic system (100) was also used during storage in a hot water environment. With the help of this process, the extraction time, which varies between 4-10 hours depending on the production dec in the classical method, was reduced by at least 50% with the help of ohmic system (100) and an increase in extraction efficiency by 25% was achieved with the help of this process. In addition, the use of the ohmic system (100) instead of the use of steam for heating purposes also allowed the production of an economically cheaper gelatine.

The invention claimed is:

1. A process for producing gelatin from a fish skin, the process comprising:

(a) drying the fish skin at a temperature of between 75° C. to 85° C. until a moisture content of the dried fish skin is less than a 15% by weight;
(b) cleaning the dried fish skin with clean water;

(c) degreasing the cleaned fish skin with fish ether for a period of time of seven hours to nine hours such that a fat content of the degreased fish skin is less than 1% by weight;

(d) removing impurities from the degreased fish skin by soaking and stirring the degreased fish skin in a sodium chloride solution (NaCl) of 1% concentration for a period of time of one hour;

(e) cleaning the impurity-removed fish skin with deionized water and the NaCl;

(f) ultra-high pressure treating the cleaned impurity-removed cleaned fish skin at a rate of five milliliters per gram of fish skin and adding deionized water to the fish skin and then placing the fish skin under a pressure of 380 Mpa to 420 MPa for a period of time of 20 minutes to 25 minutes to produce a fish skin slurry;

(g) collagen gel extracting by beating the fish skin of step (f) and adding deionized water to the fish skin slurry at a ratio of ten milliliters of deionized water per one gram of fish skin at a temperature of 58° C. to 62° C. and at a pH of 6.0 for four hours;

(h) centrifuging the extracted collagen gel of step (g) at 4000 revolutions per minute for thirty minutes;

(i) inflating the extracted collagen gel by exposing raw material to an ohmic system, an ultrasound system, a hydrostatic pressure system, a homogenization system, a microwave system, and combinations thereof; and (j) drying a supernatant form the centrifuged extracted collagen gel of step (h) at 50° C. to 55° C. until a moisture content of the supernatant is less than 14% by weight so as to obtain the produced gelatin.

* * * * *